(12) United States Patent
Haq

(10) Patent No.: US 9,652,203 B1
(45) Date of Patent: May 16, 2017

(54) APPLICATION DEVELOPMENT FRAMEWORK USING CONFIGURABLE DATA TYPES

(71) Applicant: Corpa Inc, San Francisco, CA (US)

(72) Inventor: Inam Haq, San Francisco, CA (US)

(73) Assignee: Corpa Inc., San Francisco, CA (US)

( * ) Notice: Subject to any disclaimer, the term of this patent is extended or adjusted under 35 U.S.C. 154(b) by 0 days.

(21) Appl. No.: 14/951,433

(22) Filed: Nov. 24, 2015

(51) Int. Cl.
G06F 9/44 (2006.01)
G06F 3/0484 (2013.01)
G06F 3/0486 (2013.01)
G06Q 10/06 (2012.01)

(52) U.S. Cl.
CPC ............. *G06F 8/34* (2013.01); *G06F 3/0486* (2013.01); *G06F 3/04842* (2013.01); *G06F 8/36* (2013.01); *G06Q 10/06316* (2013.01)

(58) Field of Classification Search
CPC ..... G06F 8/30; G06F 8/34; G06F 8/36; G06F 8/70; G06F 9/4421; G06F 9/4425; G06F 9/44521; G06F 9/44526; G06F 9/4806; G06F 3/0486; G06F 3/04842; G06Q 10/06316
See application file for complete search history.

(56) References Cited

U.S. PATENT DOCUMENTS

| | | | | |
|---|---|---|---|---|
| 5,999,729 | A * | 12/1999 | Tabloski, Jr. ............. | G06F 8/34 717/105 |
| 7,451,432 | B2 * | 11/2008 | Shukla ...................... | G06F 8/36 717/105 |
| 8,443,036 | B2 * | 5/2013 | Li ........................... | G06Q 10/10 707/802 |
| 2003/0005412 | A1 * | 1/2003 | Eanes ....................... | G06F 8/34 717/120 |
| 2006/0070025 | A1 * | 3/2006 | Mauceri .................. | G06Q 10/10 717/106 |
| 2006/0074736 | A1 * | 4/2006 | Shukla .................... | G06Q 10/06 717/100 |

(Continued)

OTHER PUBLICATIONS

Rupietta, W., WorkParty—Business Processes and Workflow Management, International Handbooks on Information Systems, 1998, pp. 569-589, [retrieved on Jan. 9, 2017], Retrieved from the Internet: <URL:http://link.springer.com/chapter/10.1007%2F3-540-26661-5_23>.*

(Continued)

*Primary Examiner* — Geoffrey St Leger
(74) *Attorney, Agent, or Firm* — Fenwick & West LLP

(57) ABSTRACT

Disclosed by way of example embodiments is an application development and execution framework that enables application developers to create comprehensive business software without writing code and/or complex business or data manipulation logic. The fundamental building blocks of the framework are configurable dynamic data types that operate as pre-programmed units configured to perform one or more data collection and/or data manipulation operations. An application developer can combine and extend a variety of the configurable dynamic data types to create software that encapsulates complex business workflows. Importantly, the configurable dynamic data types can be configured and combined in an easy-to-use graphical interface that enables faster and less time-consuming application development.

26 Claims, 6 Drawing Sheets

(56) References Cited

U.S. PATENT DOCUMENTS

| | | | | |
|---|---|---|---|---|
| 2007/0226678 A1* | 9/2007 | Li | ............... | G06Q 10/10 |
| | | | | 717/101 |
| 2007/0236509 A1* | 10/2007 | Eldridge | ............... | G06F 3/0486 |
| | | | | 345/619 |
| 2008/0256508 A1* | 10/2008 | Jonsson | ............... | G06F 8/10 |
| | | | | 717/104 |
| 2009/0006154 A1* | 1/2009 | Hao | ............... | G06Q 10/06316 |
| | | | | 705/7.26 |
| 2009/0037875 A1* | 2/2009 | Jones | ............... | G06F 8/34 |
| | | | | 717/109 |
| 2011/0119651 A1* | 5/2011 | Utschig-Utschig | ....... | G06F 8/35 |
| | | | | 717/107 |
| 2013/0152041 A1* | 6/2013 | Hatfield | ............... | G06Q 10/06 |
| | | | | 717/105 |
| 2015/0160835 A1* | 6/2015 | Singh | ............... | G06F 3/04842 |
| | | | | 715/734 |
| 2015/0271267 A1* | 9/2015 | Solis | ............... | G06F 17/30174 |
| | | | | 709/213 |
| 2016/0170721 A1* | 6/2016 | Heiss | ............... | G06F 8/35 |
| | | | | 717/107 |

OTHER PUBLICATIONS

Ingalls, D., et al., Fabrik—A Visual Programming Environment, Conference proceedings on Object-oriented programming systems, languages and applications, Sep. 25-30, 1988, pp. 176-190, [retrieved on Jan. 9, 2017], Retrieved from the Internet: <URL:http://dl.acm.org/>.*

PCT International Search Report and Written Opinion, PCT Application No. PCT/US16/63404, Jan. 6, 2017, 14 pages.

* cited by examiner

APPLICATION DEVELOPMENT FRAMEWORK USING CONFIGURABLE DATA TYPES

BACKGROUND

Field of Art

The disclosure generally relates to the field of enterprise application development.

Description of Art

Building enterprise software, such as customer relationship management software and enterprise resource planning software, is a complex and tedious process. In particular, every such application requires significant human effort for building and configuring the application. Further, enterprise software treats different organizations within an enterprise as distinct entities such that disparate software is created for each organization. This disjointed software development process results in at least two inefficiencies. First, a significant amount of the underlying infrastructure needed to build enterprise software is the same. However, when building disparate software for each organization in the enterprise, application developers often waste resources recreating infrastructure that was already previously created for a different organization. Second, because different organizations in an enterprise often have shared business workflows, the disparate software created for the different organizations must typically be bridged to integrate together. This creates additional overhead in terms of time, cost, and human effort.

BRIEF DESCRIPTION OF THE DRAWINGS

The disclosed embodiments have advantages and features that will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments is an application development and execution framework that enables application developers to create comprehensive business software without writing code and/or complex business or data manipulation logic. The application development and execution framework can be a system, method and/or a computer program product (e.g., a computer readable storage medium that stores instructions executable by one or more processing units).

The application framework is powered by an application model that allows application developers to quickly build complex business workflows using a graphical user interface. The fundamental building blocks of the application model are configurable dynamic data types that operate as pre-programmed units configured to perform one or more data collection and/or data manipulation operations. An application developer may combine and extend a variety of the configurable dynamic data types to create software that encapsulates complex business workflows. Importantly, the configurable dynamic data types can be configured and combined in an easy-to-use graphical interface that enables faster and less resource intensive application development.

Application Model

Figure 1:
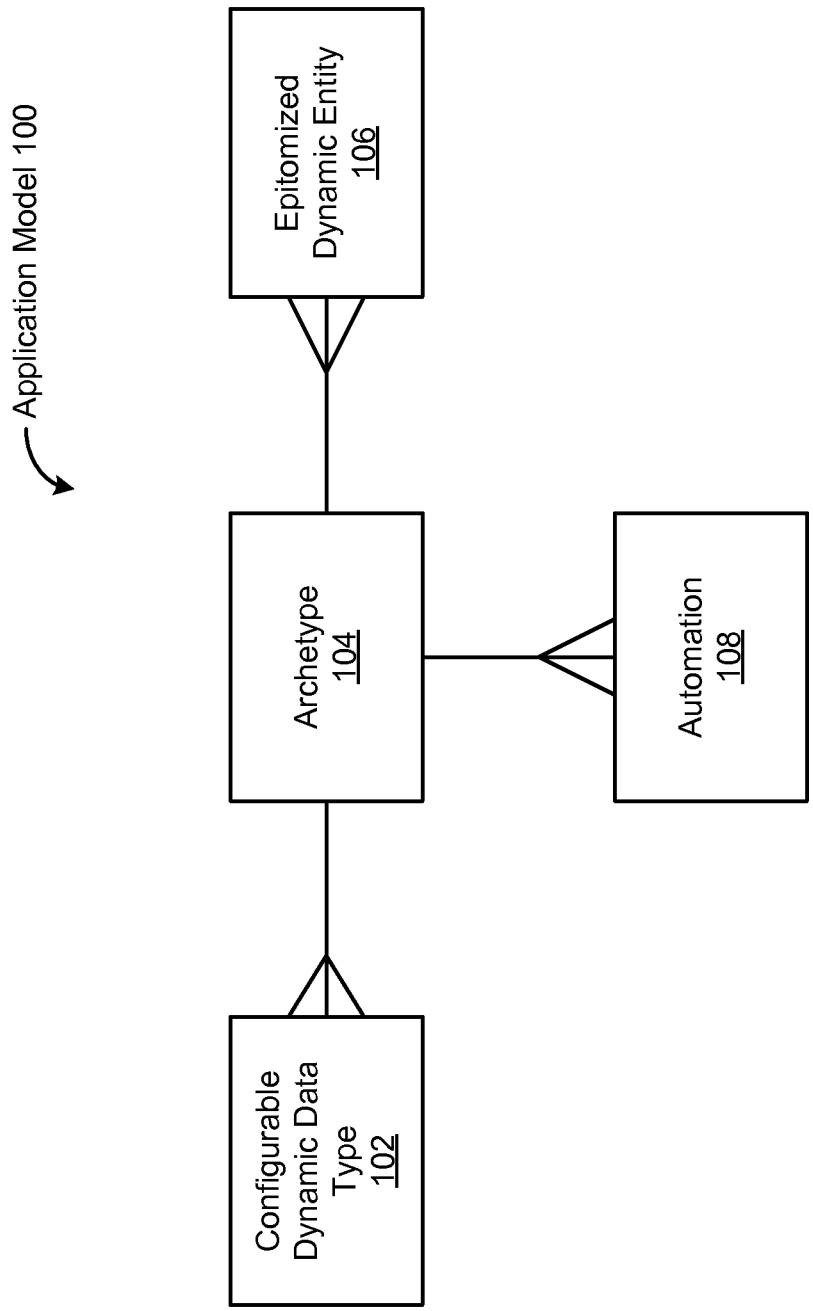
FIG. 1 illustrates the application model, in accordance with an embodiment.

Figure (FIG. 1 illustrates the application model 100 in accordance with an example embodiment. The application model 100 comprises at least four components: a configurable dynamic data type (CDDT) 102 (collectively, CDDTs 102), an archetype 104 (collectively, archetypes 104), an epitomized dynamic entity (EDE) 106 (collectively, EDEs 106), and automation 108 (collectively, automations 108).

The configurable dynamic data type (CDDT) 102 is the fundamental building block of application development. The CDDTs 102 are pre-programmed units that may be combined by an application developer to create a particular application or a portion of an application. Each CDDT 102 has a data type, a data field, one or more attributes, and help text. The data type of a CDDT 102 corresponds to the type of data that may be stored in the data field of the CDDT 102. The attributes of a CDDT 102 identify other constraints on the data that may be stored in the data field of the CDDT 102. A CDDT 102 may either be a simple data type, for example, a text or a number, or may be a more complex data type, for example, a contact or a calculation. In some embodiments, the CDDT 102 is configured with built-in code such that, given an input value, the CDDT 102 is configured to automatically perform a complex operation on the input value. Table 1 illustrates a list of exemplary CDDTs 102 and the corresponding attributes.

TABLE 1

| CDDT | Attributes |
| --- | --- |
| Text | Single/Multiple Line, Size, Font |
| Number | Whole, Decimal |
| Calculation | Formulas |
| Relationship | Other Archetype(s) |
| Currency | List of Currencies |

TABLE 1-continued

| CDDT | Attributes |
| --- | --- |
| Category | Text, Colors |
| Internal Contact | Employee Directory |
| External Contact | Name, Title, Email, Phone Number, Address |
| Date and Time | Show in Calendar, Start Date, End Date |
| File | Type of File, Size |
| Image | Type of Image, Size |
| Barcode | NA |
| Signature | NA |

The archetype 104 defines the structure of an application or a portion of an application being created. In the application model 100, the archetype 104 has a one-to-many relationship with the CDDTs 102 such that each archetype includes a collection of CDDTs 102 selected by the application developer. The CDDTs included in a given archetype 104 are configured according to the goals of the application being created. For example, for a recruiting application, the application developer may create a job posting archetype and a candidate archetype. The job posting archetype may include several text CDDTs for textual descriptions of the job, a number CDDT for an expected salary, and a contact CDDT for identifying a hiring manager. The candidate archetype may include several text CDDTs for textual descriptions of a candidate, a relationship CDDT that links the candidate archetype to the job posting archetype, and a category CDDT that indicates whether a candidate is to be hired.

The epitomized dynamic entity (EDE) 106 is a run-time instantiation of a corresponding archetype. The EDE 106 has the structure defined by the corresponding archetype and enables a user to provide values for data fields of the various CDDTs included in the archetype. In the application model 100, the EDE 106 has a many-to-one relationship with the archetype 104 such that many different instantiations of an archetype 104 may be created via the EDEs 106. Continuing the example above, when the recruiting application is executed, a job posting EDE may be instantiated from the job posting archetype for entering a new job posting into the system. Further, when a candidate applies for that job, a candidate EDE may be instantiated from the candidate archetype, where the candidate EDE is linked to the job posting EDE by virtue of the archetype relationship.

The automation 108 defines an automated workflow that is triggered upon one or more conditions occurring during the creation or modification of an EDE associated with a given archetype. In the application model 100, automation 108 has a many-to-one relationship with the archetype 104 such that many different automated workflows may be associated with the archetype via the automations 108. Continuing the example above, the application developer may create an automation associated with the candidate archetype such that, when the category CDDT is toggled to indicate that a candidate is to be hired, an offer letter for the candidate is automatically generated. Further, the automation may further specify that the content of the offer letter is to be sourced from different CDDTs in the job posting archetype and the candidate archetype.

The application model 100 enables application developers to create applications quickly using the configurable dynamic data types (CDDTs) to create complex archetypes. Further, the automations 108 in the application model 100 allow developers to easily define a variety of sophisticated business workflows that trigger automatically. As will be discussed in greater detail below, being able to define applications and workflows in such a manner enables developers to create comprehensive business software without writing code and/or complex business or data manipulation logic.

Application Development Environment

Figure 2:
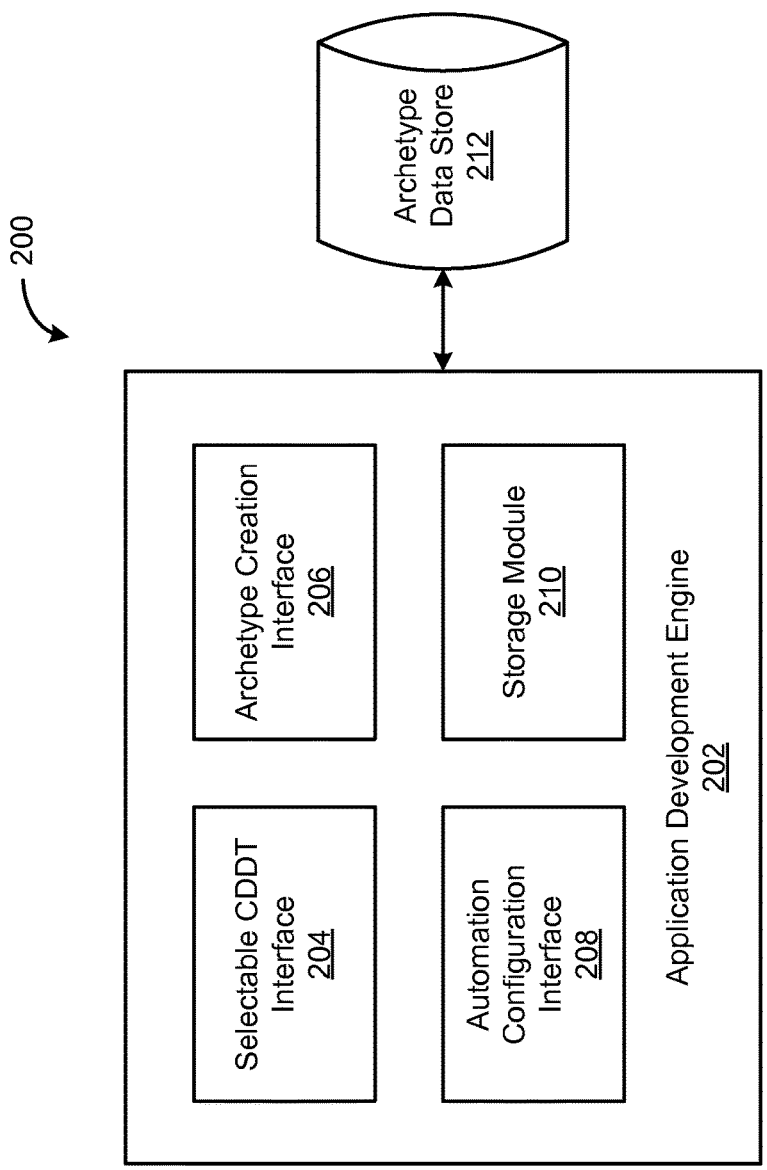
FIG. 2 illustrates a system for developing an application according to the application model of FIG. 1, in accordance with an embodiment.

FIG. 2 illustrates a system 200 for developing an application according to the application model 100 of FIG. 1, in accordance with an example embodiment. The system 200 includes an application development engine 202 and an archetype data store 212.

The application development engine 202 (also referred to as "development engine 202") allows an application developer to create one or more applications using the components of the application model 100. The application development engine 202 may execute on a mobile device, a tablet computer, or a desktop computer operated by the application developer. The development engine 202 includes a selectable CDDT interface 204, an archetype creation interface 206, an automation configuration interface 208, and a storage module 210.

The selectable CDDT interface 204 may be a graphical user interface (GUI) that enables an application developer to select CDDTs for inclusion in an archetype being created. The selectable CDDT interface 204 may include a separate GUI element that may be independently manipulated for each CDDT in the application model 100. In one embodiment, the separate GUI element for each CDDT is a drag-and-drop element that may be manipulated by touch on a touch-screen or using a selection device such as a mouse.

The archetype creation interface 206 is a graphical user interface that enables an application developer to define the structure of an archetype. In operation, an application developer determines a business workflow for which to create an archetype and selects the specific CDDTs from the selectable CDDT interface 204 that need to be included in the archetype to encapsulate that business workflow. In one embodiment, the archetype creation interface 206 enables the application developer to drag and drop a CDDT GUI element.

The archetype creation interface 206 also enables the application developer to configure the CDDTs selected for inclusion in the archetype. In operation, for each CDDT selected, the archetype creation interface 206 allows the application developer to provide a name for the CDDT that is to be displayed when the archetype is initiated and select the values for the attributes associated with the CDDT. For example, for the currency CDDT, the archetype creation interface 206 allows the application developer to specify a name for the CDDT and values for (i) whether the data field for the CDDT is required, (ii) the currency of choice selected from a list of pre-configured currencies, and (iii) any help text to be displayed in conjunction with the CDDT.

For more complex CDDTs, the archetype creation interface 206 also allows the application developer to configure the CDDTs according to the business workflow being encapsulated. Specifically, for a relationship CDDT, the archetype creation interface 206 allows the application developer to select one or more other archetypes that were previously created that are to be linked to the current archetype. Once the application developer links a previously created archetype, the CDDTs in the previously created archetype are available for manipulation within the current archetype. In one embodiment, the relationship CDDT, when added to the archetype creation interface 206, is populated with all the archetypes that were previously created and are available to the application developer for linking with the archetype being created. In another embodiment, the archetype creations interface 206 selects a subset of all previously created archetypes for populating the relationship CDDT based on different selection criteria. The selection criteria may be, for example, whether the application developer has permission to use the archetype, whether the organization for which the current archetype is being created has permission to use the previously created archetype, whether the previously created archetype shares the same application type or business flow, etc.

For a calculation CDDT, the archetype creation interface 206 allows the application developer to select both a type of calculation and the sources of the data on which the calculation is to be performed. In one embodiment, the calculation CDDT is pre-configured with formulas that the application developer can select individually or combine to specify the calculation to be performed. Further, the sources of the data on which the calculation is to be performed may be specified as a different CDDT in the current archetype or in a different archetype linked to the current archetype.

For the file CDDT, the archetype creation interface 206 allows the application developer to specify the types of files that may be added to the CDDT. In one embodiment, the file CDDT is configured to integrate with a native file system such that files can be loaded directly from the file system. The archetype creation interface 206 also allows the developer to specify attributes of files that may be added to the CDDT, such as the maximum size, preferred file names, etc.

For the contact CDDT, the archetype creation interface 206 allows the application developer to integrate the CDDT with a contacts directory associated with the organization for which the archetype is being created. In one embodiment, the contact CDDT is pre-configured with connection information for different contact directory services. In such an embodiment, the application developer selects one of the contact directory services for integration with the contact CDDT.

The automation configuration interface 208 enables the application developer to configure the automations associated with the archetype being created. As discussed above, in the application model 100, automations define automated workflows that are triggered upon one or more conditions occurring during the creation or modification of an EDE associated with a given archetype. An automation definition includes an initiation cause, one or more trigger conditions, and an automated effect. The automation configuration interface 208 provides a graphical user interface that allows the application developer to provide configurations for each of the initiation cause, triggering conditions, and automated effect.

In one embodiment, for the initiation cause, the automation configuration interface 208 enables the application developer to specify when the automation should be initiated, e.g., when an epitomized dynamic entity is instantiated from the archetype or when an epitomized dynamic entity is modified. For the trigger condition, the automation configuration interface 208 allows the application developer to specify conditions on one or more CDDTs in the archetype that should trigger the automation. For example, for a job candidate archetype, an automation may specify a trigger condition on the CDDT that is executed when an offer is to be extended to the candidate. For the automated effect, the automation configuration interface 208 allows the application developer to select from a set of pre-configured effects including, but not limited to, (i) creating a task for a user or users in different departments of an organization, (ii) adding a comment to an EDE, (iii) creating a new EDE from the same or a different archetype, (iv) updating the same or a different EDE, (v) create a pre-formatted document or update an existing document (such as a PDF file), (vi) archiving the same or a different EDE, and (vii) sending a predefined email to a user or a group of users.

The storage module 210 stores the archetypes and associated automations in the archetype data store 212. The archetype data store 212 may be, or include, one or more tables, one or more relational databases, one or more multi-dimensional data cubes, and/or a document database. Further, though illustrated as a single component, the archetype data store 212 may be a plurality of databases, such as a database cluster, which may be implemented on a single computing device or distributed between a number of computing devices or memory components. When storing an archetype in the archetype data store, the storage module 210 generates a unique archetype identifier for storage in association with the archetype. Further, the storage module 210 may additionally store information related to the user who created the archetype, the organization name for which the archetype was created, and any metadata describing attributes of the archetype, such as the title, business flow, etc.

Application Execution Environment

Figure 3:
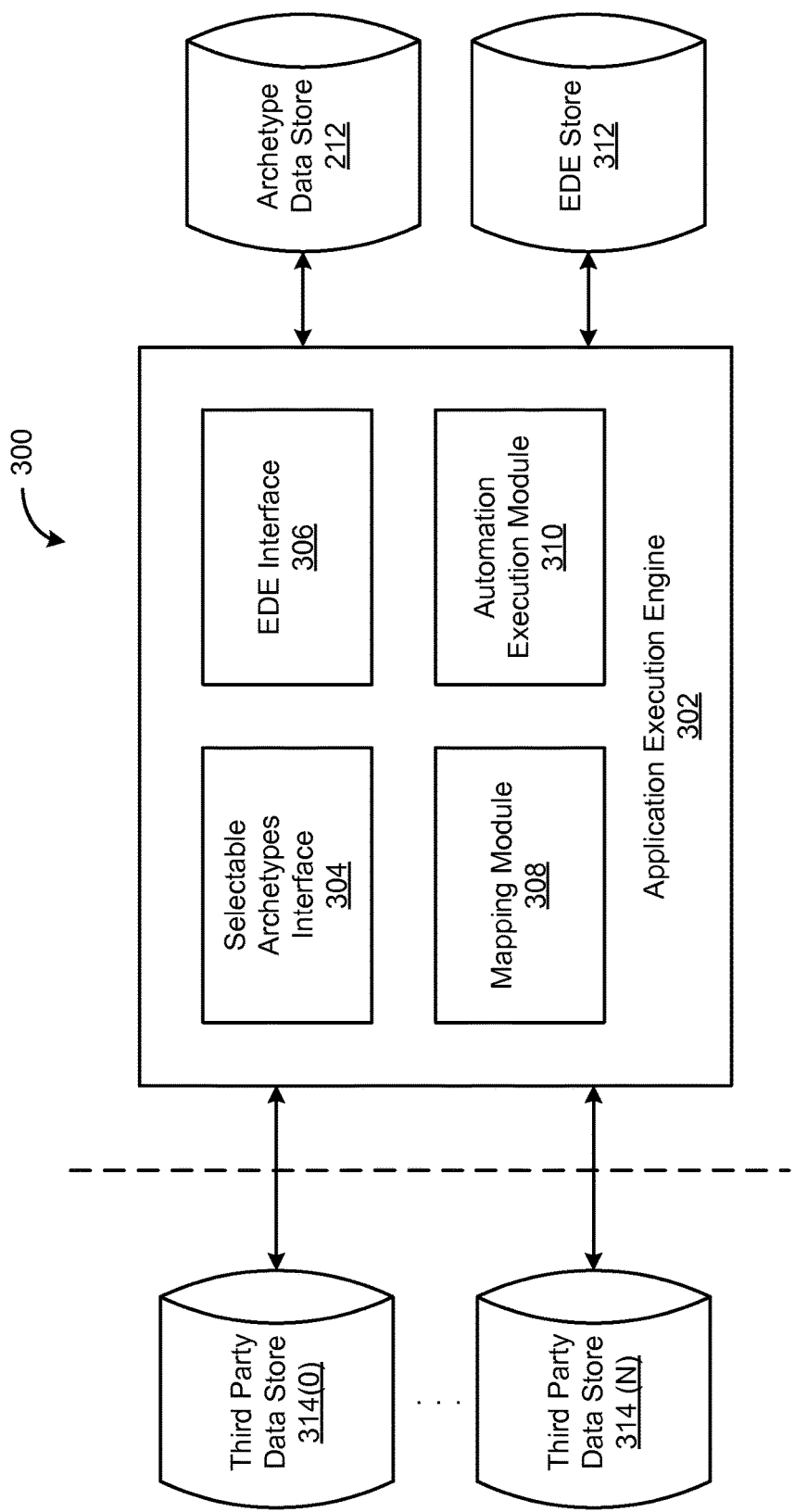
FIG. 3 illustrates a system for executing an application developed according to the application model of FIG. 1, in accordance with an embodiment.

FIG. 3 illustrates a system 300 for executing an application developed according to the application model 100 of FIG. 1, in accordance with an example embodiment. The system 300 includes an application execution engine 302, an EDE data store 312, and third party data stores 314(0)-314(N), collectively, third party data stores 314.

The application execution engine 302 (also referred to as "execution engine 302") allows users to execute applications developed according to the application model 100. The application development engine 202 may operate on a mobile device, a tablet computer, or a desktop computer. The execution engine 302 includes selectable archetype interface 304, an EDE interface 306, a mapping module 308, and an automation execution module 310. The various modules and interfaces included in the execution engine 302 may be physically co-located within one computing system or, alternatively, may be disparately located across multiple computing systems.

The selectable archetype interface 304 is a graphical user interface (GUI) that enables a user to select for instantiation a previously created archetype stored in the archetype data store 212. In operation, the selectable archetype interface 304 presents the user with archetypes in the archetype data store 212. In some embodiments, the selectable archetype interface 304 determines a subset of the archetypes in the data store 212 that are to be presented to the user based on one or more criteria. For example, for a given user, the selectable archetype interface 304 may only present the archetypes that the user has permission to instantiate and/or the archetypes that are associated with the particular organization with which the user is affiliated. In another example, the selectable archetype interface 304 may present the archetypes that are relevant to a current context of the application execution engine, e.g., in a human resources business flow, and/or archetypes that are related to one or more previous archetypes selected by the user. In one embodiment, the selectable archetype interface 304 may include a separate GUI element for each archetype that may be independently manipulated.

The EDE interface 306 is a graphical user interface that enables the user to provide or modify data associated with the epitomized dynamic entity created when the selected archetype is instantiated. As discussed above, an epitomized dynamic entity is an instantiation of an archetype that includes the CDDTs included in the archetype, where a user may populate the data fields of the CDDTs. The EDE interface 306 generates an input interface according to the CDDTs that are included in the selected archetype. In one embodiment, the EDE interface 306 configures the graphical element associated with each CDDT according to the attributes provided for that CDDT during archetype creation. For example, for the contacts CDDT that is linked to an organizational contacts directory, the EDE interface 306 creates an interface element that allows a user to select one or more contacts from the contacts directory. The user enters data for each CDDT represented in the EDE interface 306. In one embodiment, as the user enters the data, the EDE interface 306 caches the data in a local cache of the device on which the application execution engine 302 is executing.

When the user finishes entering the required data in the interface, the EDE interface 306 transmits a request to the mapping module 308 for storing the EDE. The mapping module 308 is configured to store the data of the EDE separately from identifying attributes of the EDE. In operation, the mapping module 308 stores identifying attributes of the EDE in the EDE store 312. For each EDE, the mapping module 308 stores in the EDE store a unique identifier generated for the EDE and a relationship to the archetype from which the EDE was instantiated. Further, the mapping module 308 may store information related to the user who created the EDE and the organization name for which the EDE was created. The EDE store 312 may be, or include, one or more tables, one or more relational databases, one or more multi-dimensional data cubes, and/or a document database. Further, though illustrated as a single component, the EDE store 312 may be a plurality of databases, such as a database cluster, which may be implemented on a single computing device or distributed between a number of computing devices or memory components.

Further, the mapping module 308 is configured to transmit the data for the different CDDTs in the EDE to the third party data stores 314 for storage. In one embodiment, the third party data stores 314 may be legacy storage systems operated by the enterprise for which the EDEs are being created. Storing the data in the third party data stores 314 allows for the management and security of the data to be handled outside of the application execution engine and the local data stores. In operation, the mapping module 308 includes data mapping (e.g., extract, transform, load (ETL)) configurations for each archetype in the archetype data store 212. These configurations map CDDTs in that archetype to one or more of the third party data stores 314. For each CDDT in the EDE, the mapping module 308 transforms the data for the CDDT into a proper form based on the requisite data mapping configuration for storage in the third party data stores 314. The mapping module 308 transmits the transformed data to the third party data stores for storage. In one embodiment, the mapping module 308 also transmits the unique identifier associated with the EDE for storage in conjunction with the data so that the data can be retrieved at a later time.

As discussed above, the EDE interface 306 also enables the user to provide or modify data associated with a previously created epitomized dynamic entity. In operation, the EDE interface 306 retrieves the information identifying the EDE from the EDE store 312. The EDE interface 306 also transmits a request to the mapping module 308 for retrieving data associated with the EDE from the third party data stores 314. Upon receiving the data, the EDE interface 306 presents a graphical interface to the user that enables the user to modify the data. Once the user modifies the data, the mapping module 308 stores the data is in the same manner as that described above in conjunction with storing data for the EDE at creation.

In one embodiment, each time an EDE is modified, the mapping module 308 stores a new version of the EDE and the associated data without changing the previous version(s). In operation, the mapping module 308 stores each version of the EDE and the associated data in association with a different contextual number. The contextual number is indicative of the version of the EDE and the associated data relative to other versions. The contextual number of a particular EDE allows other EDEs generated based on related archetypes to be linked to the version of the EDE that existed when the other EDEs were generated. For example, for an exchange rate archetype, different versions of the EDE may be created based on the changing exchange rates, where each version of the EDE has a different contextual number. When an invoice EDE is generated from an invoice archetype linked to the exchange rate archetype, the invoice EDE is linked to the contextual number of the exchange rate EDE existing at that time. At a later time, additional exchange rate EDEs may be created as the exchange rate changes, but the link between the invoice EDE and the contextual number of the particular exchange rate EDE allows the calculations for the invoice EDE that use the exchange rate to remain unchanged.

The automation execution module 310 executes automations that are triggered by the data provided for the newly created or edited EDEs. As discussed above, an archetype may be associated with one or more automations that define a workflow that is automatically triggered when certain conditions are met. When an EDE is created or edited, the automation execution module 310 determines whether any automations are associated with the archetype from which the EDE was instantiated. If the archetype is associated with an automation, then the automation execution module 310 determines whether the triggering conditions specified by the automation are satisfied by the data provided for the CDDTs included in the EDE. When the triggering conditions are satisfied, the automation execution module 310 executes the automated effect defined by the automation.

Figure 4:
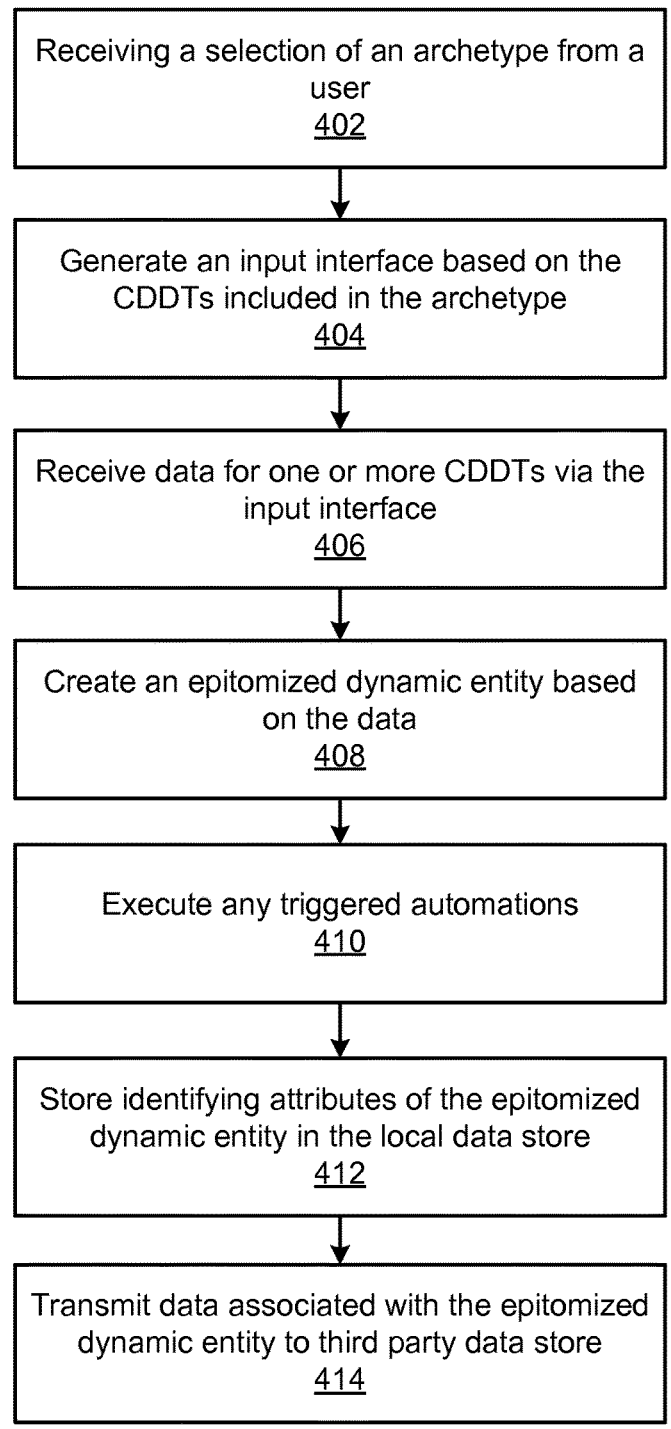
FIG. 4 is a flow chart for executing an application developed according to the application model of FIG. 1, in accordance with an embodiment.

FIG. 4 is a flow chart for executing an application developed according to the application model 100 of FIG. 1, in accordance with an embodiment. Other embodiments may perform the steps of the process illustrated in FIG. 4 in different orders and can include different, additional and/or fewer steps. The process may be performed by any suitable entity, such as the application execution engine 302.

The application execution engine 302 receives 402 a selection of an archetype from a user. The user selects the archetype from a set of previously created archetypes that are each configured with configurable dynamic data types (CDDTs) for collecting or processing data associated with a business flow. In one embodiment, the application execution engine 302 receives the selection via a graphical user interface that presents all relevant archetypes to the user.

The application execution engine 302 then generates 404 an input interface based on the CDDTs included in the selected archetype. In one embodiment, the EDE interface 306 configures the graphical element associated with each CDDT according to the attributes provided for that CDDT. The application execution engine 302 receives 406 data for the one or more CDDTs via the input interface. In operation, the user manipulates the interface via input mechanisms, such as touch, keypads, mouse movement, etc., to provide data for the requisite CDDTs included in the archetype. In some cases, a CDDT does not require a user input because the CDDT may be auto-filled based on data provided for other CDDTs. For example, a calculation CDDT may be configured with a formula that will automatically execute based on data provided for one or more other CDDTs and thus is automatically populated.

Once the user enters the data, the application execution engine 302 creates an epitomized dynamic entity based on the data. The epitomized dynamic entity has the structure of the archetype from which the entity was instantiated and also includes the data provided by the user or automatically computed for the different CDDTs. The application execution engine 302 also executes 410 any automations associated with the selected archetype that are triggered by the data associated with the different CDDTs. As discussed above, an automation defines an automated workflow that is triggered upon one or more conditions occurring during the creation or modification of an EDE associated with a given archetype.

The application execution engine 302 stores 412 identifying attributes of the epitomized dynamic entity in the EDE store 312. For each EDE, the application execution engine 302 stores in the EDE store 312 a unique identifier generated for the EDE and a relationship to the archetype from which the EDE was instantiated. The application execution engine 302 transmits 414 the data associated with the EDE, i.e., the data for the different CDDTs in the EDE, to a third party data store for storage. In one embodiment, the data in the third party data storage is stored in conjunction with the identifier associated with the EDE such that the data can be retrieved at a later time by the application execution engine 302.

Example Human Resources Workflow

Figure 5:
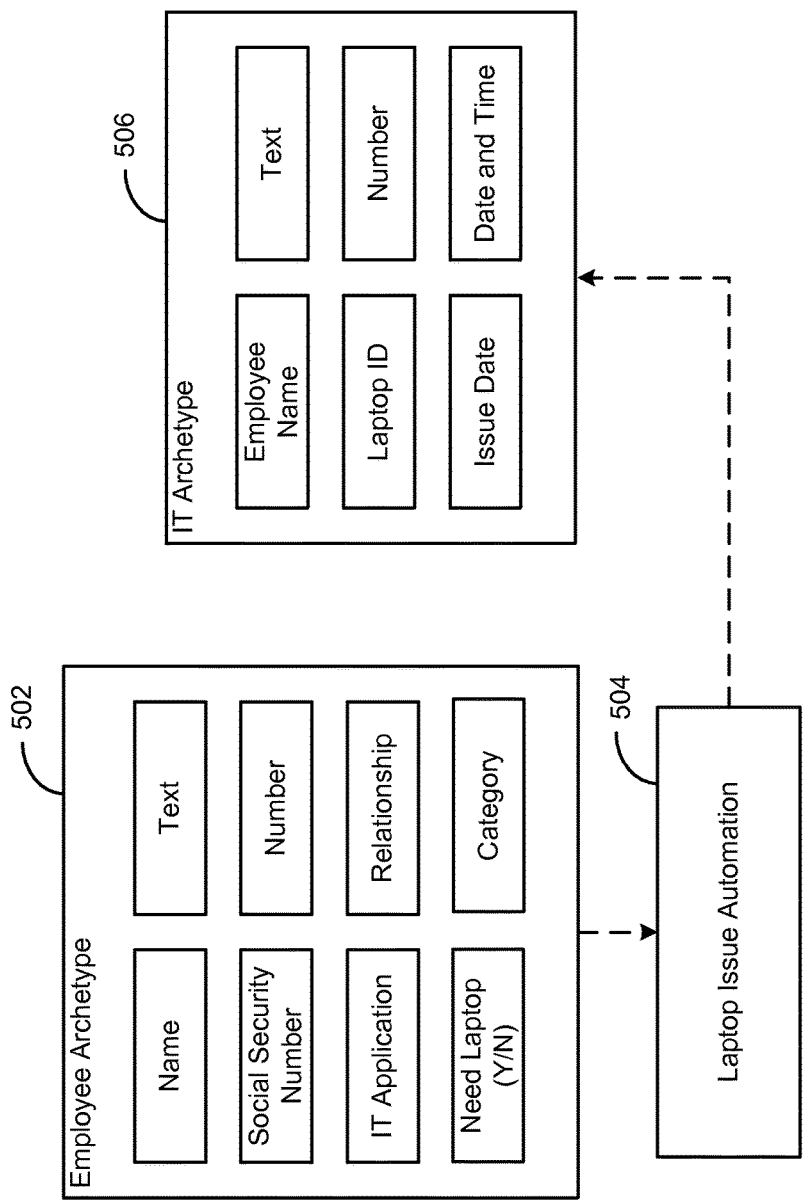
FIG. 5 illustrates exemplary archetypes created for a human resources workflow, in accordance with an embodiment.

FIG. 5 illustrates exemplary archetypes created for a human resources workflow, in accordance with an embodiment. The illustrated example includes an employee archetype 502, a laptop issue automation 504, and an information technology (IT) archetype 506.

The employee archetype 502 includes CDDTs related to employee information, such as the employee's name and social security number. The employee archetype 502 also includes a relationship CDDT that links the employee archetype 502 with the IT archetype 506 and a category CDDT for capturing whether the employee needs a laptop. The IT archetype 506 includes CDDTs for the employee name, laptop identifier, and an issue date.

The laptop issue automation 504 triggers the "Need Laptop" CDDT for an EDE instantiated from the employee archetype 502 indicates that the employee needs a new laptop. When the trigger condition is satisfied, the application execution engine 302 automatically instantiates an EDE from the IT archetype 506 to issue a new laptop for the employee. The application execution engine 302 automatically populates the employee name CDDT in the IT archetype 506 from the name CDDT in the employee archetype 502.

Example Machine Architecture

Figure 6:
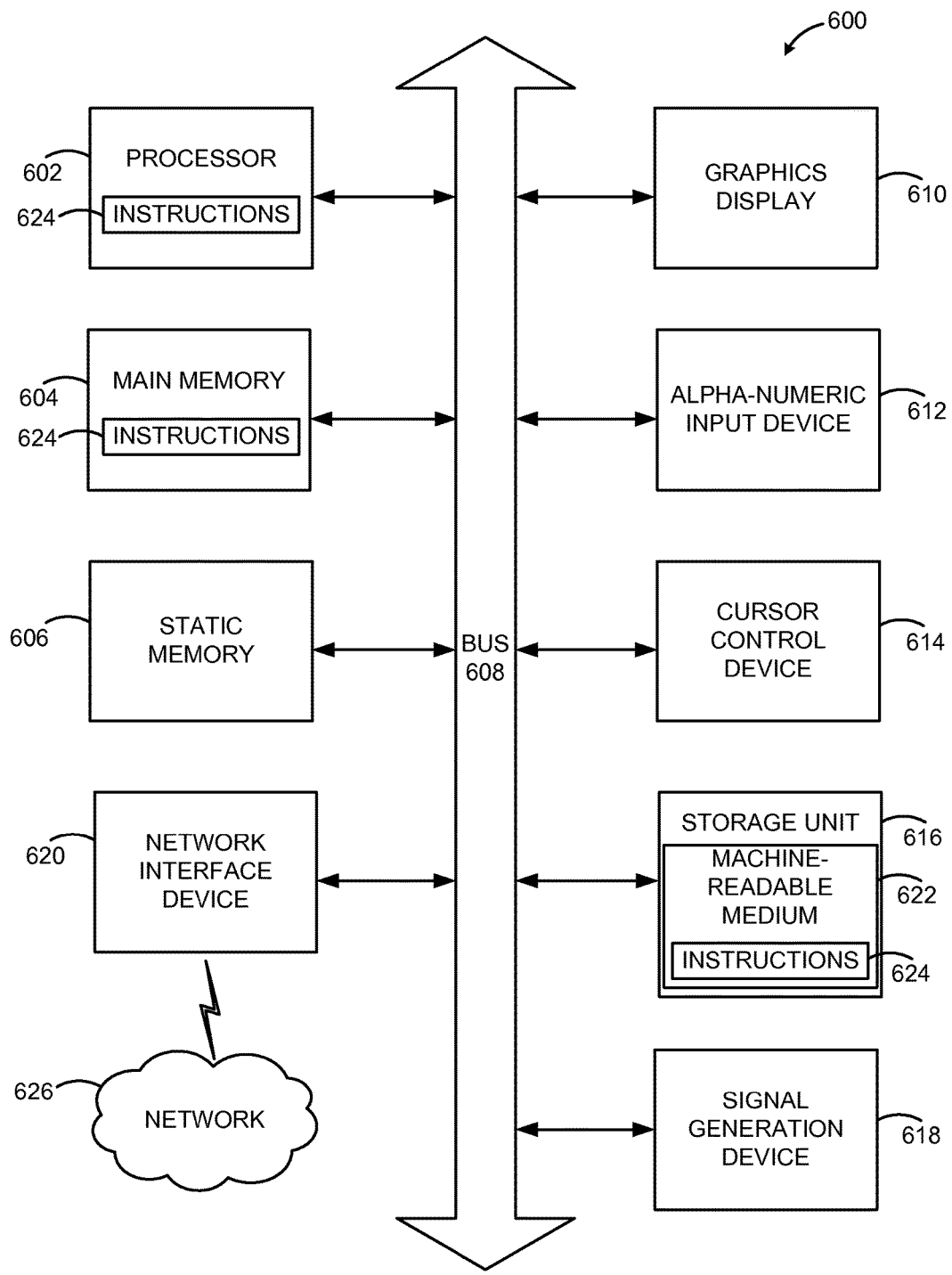
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600. The computer system 600 can be used to execute instructions 624 (e.g., program code or software) for causing the machine to perform any of one or more of the methodologies (or processes) described herein (e.g., the modules described in FIGS. 2 and 3 and the processes described in FIGS. 4 and 5). In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604 and the storage unit 616 communicate via a bus 608.

In addition, the computer system 600 can include a static memory 606, a display driver 160 (e.g., to drive a plasma display panel (PDP), a liquid crystal display (LCD), or a projector). The computer system 600 may also include alphanumeric input device 762 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any of one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any of one or more of the methodologies disclosed herein. The term "machine-readable medium" includes, but is not limited to, data repositories in the form of solid-state memories, optical media, and magnetic media.

Additional Considerations

The application model and development tools described herein enable application developers to create applications quickly using the configurable dynamic data types to create complex archetypes. Further, the automations in the application model allow developers to easily define a variety of sophisticated business workflows that trigger automatically.

Being able to define applications and workflows in such a manner enables developers to create comprehensive business software without writing code and/or complex business or data manipulation logic.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 2 and 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating applications using configurable dynamic data types through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for executing software applications, the method comprising:
   receiving a selection of an archetype from a graphical user interface presented on a display, the archetype comprising a dynamic data type for collecting data and an automation,
      the dynamic data type specifying (i) a data field for collecting data associated with the dynamic data type, (ii) a plurality of attributes constraining a value of the collected data, and (iii) an operation to be performed on the collected data at run-time, and
      the automation specifying (i) an automated effect to be performed at run-time in relation to the archetype, (ii) an initiation cause that indicates when the automation is to be initiated, and (iii) a trigger condition that indicates a condition on the dynamic data type that causes the automated effect to be performed;
   generating an input interface for collecting the data associated with the dynamic data type;
   creating at run-time an epitomized dynamic entity associated with the archetype, the epitomized dynamic entity having a structure of the archetype and including processed data generated by applying the operation to the collected data;
   determining based on the processed data that the trigger condition specified by the automation is satisfied; and
   executing the automated effect on a second epitomized dynamic entity associated with the second archetype.

2. The method of claim 1, further comprising:
   storing identifying information associated with the epitomized dynamic entity in a local store; and
   storing the data included in the epitomized dynamic entity in a third party store independent from the local store.

3. The method of claim 2, wherein storing the data included in the epitomized dynamic entity comprises determining a data mapping configuration associated with the archetype that specifies how data collected by the dynamic data type is to be stored in the third party store.

4. The method of claim 2, wherein storing the data included in the epitomized dynamic entity comprises storing identifying information in conjunction with the data in the third party store.

5. The method of claim 4, further comprising:
   determining that the epitomized dynamic entity is to be modified;
   retrieving the identifying information associated with the epitomized dynamic entity from the local store;
   retrieving from the third party store the data stored in conjunction with the identifying information; and
   presenting an interface for modifying the retrieved data.

6. The method of claim 1, further comprising:
   identifying a subset of previously created archetypes stored in a local store that the user has permission to access; and
   displaying the subset of the previously created archetypes in the graphical user interface.

7. The method of claim 1, wherein the dynamic data type is configured with one or more formulas that are automatically applied to the data when the epitomized dynamic entity is created or modified.

8. The method of claim 1, wherein the dynamic data type is configured with selectable contacts included in an organizational contact directory.

9. The method of claim 1, wherein executing the automated effect on the second epitomized dynamic entity comprises creating at run-time the second epitomized dynamic entity associated with the second archetype, the second epitomized dynamic entity having a structure of the second archetype and including second data derived from the epitomized dynamic entity.

10. The method of claim 1, wherein executing the automated effect on the second epitomized dynamic entity comprises modifying at run-time data included in the second epitomized dynamic entity associated with the second archetype, the second epitomized dynamic entity having a structure of the second archetype, and the modified data derived from the epitomized dynamic entity.

11. A non-transitory computer readable medium configured to store instructions, the instructions when executed by a processor cause the processor to:
   receive a selection of an archetype from a graphical user interface to present on a display, the archetype comprising a dynamic data type for collecting data and an automation,
      the dynamic data type specifying (i) a data field for collecting data associated with the dynamic data type, (ii) a plurality of attributes constraining a value of the collected data, and (iii) an operation to be performed on the collected data at run-time, and
      the automation specifying (i) an automated effect to be performed at run-time in relation to the archetype, (ii) an initiation cause that indicates when the automation is to be initiated, and (iii) a trigger condition that indicates a condition on the dynamic data type that causes the automated effect to be performed;
   generate an input interface for collecting the data associated with the dynamic data type;
   create at run-time an epitomized dynamic entity associated with the archetype, the epitomized dynamic entity having a structure of the archetype and including the data collected via the input interface;
   determine based on the data that the trigger condition specified by the automation is satisfied; and
   execute the automated effect on a second epitomized dynamic entity associated with the second archetype.

12. The computer readable medium of claim 11, the instructions when executed by a processor further cause the processor to:

store identifying information associated with the epitomized dynamic entity in a local store; and store the data included in the epitomized dynamic entity in a third party store independent from the local store.

13. The computer readable medium of claim 12, wherein the instructions to store the data included in the epitomized dynamic entity further comprises instructions to determine a data mapping configuration associated with the archetype that specifies how data collected by the dynamic data type is to be stored in the third party store.

14. The computer readable medium of claim 12, wherein the instructions to store the data included in the epitomized dynamic entity further comprises instructions to store identifying information in conjunction with the data in the third party store.

15. The computer readable medium of claim 14, the instructions when executed by a processor further cause the processor to:

determine that the epitomized dynamic entity is to be modified;

retrieve the identifying information associated with the epitomized dynamic entity from the local store;

retrieve from the third party store the data stored in conjunction with the identifying information; and present an interface for modifying the retrieved data.

16. The computer readable medium of claim 11, the instructions when executed by a processor further cause the processor to:

identify a subset of previously created archetypes stored in a local store that the user has permission to access; and display the subset of the previously created archetypes in the graphical user interface.

17. The computer readable medium of claim 11, wherein the dynamic data type is configured with one or more formulas that are automatically applied to the data when the epitomized dynamic entity is created or modified.

18. The computer readable medium of claim 11, wherein the dynamic data type is configured with selectable contacts included in an organizational contact directory.

19. A system comprising:

a processor; and a memory storing instructions that, when executed by the processor, cause the processor to:

generate a selectable archetypes graphical user interface presented to a user configured to receive a selection of an archetype selection from the user, the archetype comprising a dynamic data type for collecting data and an automation, the dynamic data type specifying (i) a data field for collecting data associated with the dynamic data type, (ii) a plurality of attributes constraining a value of the collected data, and (iii) an operation to be performed on the collected data at run-time, and the automation specifying (i) an automated effect to be performed at run-time in relation to the archetype, (ii) an initiation cause that indicates when the automation is to be initiated, and (iii) a trigger condition that indicates a condition on the dynamic data type that causes the automated effect to be performed, generate an input interface for collecting the data associated with the dynamic data type, create at run-time an epitomized dynamic entity associated with the archetype, the epitomized dynamic entity having a structure of the archetype and including the data collected via the input interface, determine based on the data that the trigger condition specified by the automation is satisfied, and execute the automated effect on a second epitomized dynamic entity associated with the second archetype.

20. The system of claim 19, further comprising:

a mapping module configured to:

store identifying information associated with the epitomized dynamic entity in a local store; and store the data included in the epitomized dynamic entity in a third party store independent from the local store.

21. The system of claim 20, wherein storing the data included in the epitomized dynamic entity comprises determining a data mapping configuration associated with the archetype that specifies how data collected by the dynamic data type is to be stored in the third party store.

22. The system of claim 21, wherein storing the data included in the epitomized dynamic entity comprises storing identifying information in conjunction with the data in the third party store.

23. A method for developing an application, the method comprising:

presenting a graphical user interface that enables an application developer to configure a plurality of dynamic data types, each dynamic data type specifying (i) a data field for collecting data associated with the dynamic data type, (ii) a plurality of attributes constraining a value of the collected data, and (iii) an operation to be performed on the collected data at run-time;

combining the configured plurality of dynamic data types to generate an archetype that defines a structure of the application; and enabling the application developer to define an automated workflow comprising an automation that specifies (i) an automated effect to be performed at run-time in relation to the archetype, (ii) an initiation cause that indicates when the automation is to be initiated, and (iii) a trigger condition that indicates a condition on at least one of the dynamic data type that causes the automated effect to be performed.

24. The method of claim 23, wherein the graphical user interface is a drag and drop interface.

25. The method of claim 23, wherein a first dynamic data type is configured with one or more formulas that are automatically applied to data received when the archetype is instantiated.

26. The method of claim 23, wherein a first dynamic data type is configured with selectable contacts included in an organizational contact directory associated with the application.

* * * * *